United States Patent
Varma et al.

(10) Patent No.: US 11,102,140 B2
(45) Date of Patent: Aug. 24, 2021

(54) ABSTRACTION LAYER TO CLOUD SERVICES

(71) Applicant: Bank of America Corporation, Charlotte, NC (US)

(72) Inventors: Jayachandra Varma, Irving, TX (US); Manu Kurian, Dallas, TX (US); Lixian Huang, Plano, TX (US); Hemantkumar D. Gajjar, Charlotte, NC (US); Ganesh Bonda, Charlotte, NC (US); Floyd Franklin Rock, Jr., Chesterfield, VA (US)

(73) Assignee: Bank of America Corporation, Charlotte, NC (US)

( * ) Notice: Subject to any disclaimer, the term of this patent is extended or adjusted under 35 U.S.C. 154(b) by 174 days.

(21) Appl. No.: 15/972,346

(22) Filed: May 7, 2018

(65) Prior Publication Data

US 2019/0342228 A1    Nov. 7, 2019

(51) Int. Cl.
*H04L 12/911* (2013.01)
*H04L 29/08* (2006.01)

(52) U.S. Cl.
CPC .............. *H04L 47/70* (2013.01); *H04L 67/16* (2013.01); *H04L 67/32* (2013.01)

(58) Field of Classification Search
CPC ................................ H04L 47/70; H04L 67/32
See application file for complete search history.

(56) References Cited

U.S. PATENT DOCUMENTS

| | | | |
|---|---|---|---|
| 8,396,989 B2 | 3/2013 | Chaturvedi et al. | |
| 8,886,806 B2 | 11/2014 | Tung et al. | |
| 8,904,005 B2 | 12/2014 | Ferris et al. | |
| 8,924,559 B2 | 12/2014 | Brown et al. | |
| 8,924,569 B2 | 12/2014 | Li | |
| 8,954,564 B2 | 2/2015 | Ferris et al. | |
| 9,239,996 B2 * | 1/2016 | Moorthi | G06Q 10/06 |
| 9,274,848 B2 | 3/2016 | Dawson et al. | |
| 9,306,868 B2 | 4/2016 | Ferris et al. | |
| 9,430,213 B2 | 8/2016 | Fu et al. | |
| 9,462,055 B1 * | 10/2016 | Herrin | H04L 67/1095 |
| 9,749,398 B2 | 8/2017 | Li | |
| 9,755,858 B2 | 9/2017 | Bagepalli et al. | |
| 9,787,697 B2 | 10/2017 | Betz et al. | |
| 9,813,318 B2 | 11/2017 | Iyoob et al. | |

(Continued)

*Primary Examiner* — Douglas B Blair
(74) *Attorney, Agent, or Firm* — Banner & Witcott, Ltd.; Michael A. Springs

(57) ABSTRACT

Aspects of the disclosure relate to providing cloud computing resources from one or more cloud service providers for a client computing device through a computing platform. The client computing device may benefit from an economy of scale while being able to obtain different types of cloud services over a plurality of cloud providers. The client computing device may request an initial amount of cloud services and subsequently may request cloud services that utilize a requested amount of cloud resources. The requested amount of cloud resources may be apportioned among the plurality of cloud service providers, to provide the requested cloud service. The computing platform may also support a cloud abstraction layer interacting between client computing device and one or more cloud providers so that the client computing device can obtain cloud service in a transparent manner.

17 Claims, 17 Drawing Sheets

(56) References Cited

U.S. PATENT DOCUMENTS

| | | | |
|---|---|---|---|
| 10,678,602 B2* | 6/2020 | Manglik | G06F 9/5077 |
| 2011/0145439 A1* | 6/2011 | Chaturvedi | G06F 9/5027 |
| | | | 709/244 |
| 2012/0096470 A1* | 4/2012 | Bartfai-Walcott | G06F 9/5072 |
| | | | 718/103 |
| 2014/0365659 A1* | 12/2014 | Schmidt | H04L 67/1002 |
| | | | 709/226 |
| 2015/0371357 A1* | 12/2015 | Ben-Natan | G06T 1/20 |
| | | | 345/505 |
| 2016/0128083 A1* | 5/2016 | Shakya | H04W 72/0446 |
| | | | 455/406 |
| 2016/0139952 A1* | 5/2016 | Geng | G06F 9/4818 |
| | | | 718/103 |
| 2017/0339070 A1* | 11/2017 | Chang | H04L 47/829 |
| 2018/0115551 A1* | 4/2018 | Cole | H04L 41/18 |
| 2018/0145930 A1* | 5/2018 | Kostov | H04L 47/827 |
| 2019/0052643 A1* | 2/2019 | Doshi | H04L 63/20 |
| 2019/0098067 A1* | 3/2019 | Sandoval | H04L 12/12 |

* cited by examiner

1200

| 1201<br>Cloud Provider | 1202<br>Procured Units of Service | 1203<br>Type of Service |
|---|---|---|
| Provider A | 50 | High Speed Storage |
| Provider A | 10 | Software Apps A,B,C |
| Provider B | 50 | Regular Storage |
| Provider C | 15 | Software Apps D,E |
| Provider D | 50 | Development Platform |
| Provider E | 100 | Infrastructure |
| Provider E | 100 | Intrastructure |
| ▪<br>▪<br>▪ | ▪<br>▪<br>▪ | ▪<br>▪<br>▪ |

| 1301<br>Client ID | 1302<br>Re-allocated Units of Service | 1303<br>Type of Service | 1304<br>Activation Time |
|---|---|---|---|
| Client A | 35 | High Speed Storage | Prime |
| Client A | 5 | Software App A | All |
| Client B | 50 | Infrastructure | Prime |
| Remaining | 150 | Infrastructure | Prime |
| Remaining | 200 | Infrastructure | Non-Prime |
| Remaining | 15 | High Speed Storage | Prime |
| ... | ... | ... | ... |

Figure 13

ABSTRACTION LAYER TO CLOUD SERVICES

FIELD

Aspects of the disclosure relate to a client computing device obtaining computing services, through a computing platform, from one or more cloud-based providers.

BACKGROUND

Cloud-based computing is a term that refers to applications, services, or resources made available to users on demand via the Internet through a cloud provider's servers. Users typically utilize cloud-based providers as a way to increase capacity, enhance functionality, or add services on demand without having to commit to potentially expensive infrastructure costs.

A significant benefit of using a cloud service provider (CSP) is the efficiency and economies of scale. Rather than users (for example, individuals and companies) building their own infrastructure to support internal services and applications, the services may be purchased from the CSP, which provide the services to many customers from a shared infrastructure. Any approaches that facilitate obtaining cloud services would be beneficial.

SUMMARY

Aspects of the disclosure provide effective, efficient, scalable, and convenient technical solutions that address and overcome the technical problems associated with providing cloud computing services. In particular, one or more aspects of the disclosure provide techniques for re-allocating cloud resources to a client computing device through a control point (for, example a proxy server).

In accordance with one or more embodiments, a computing platform receives a resource request from a client computing device for cloud resources that were previously procured from one or more cloud service providers. The resource request may include various parameters, including an initial amount of resources and a type of cloud service to be re-allocated to the client computing device. The re-allocated cloud resources may span one or more of the cloud service providers. The initial amount of cloud resources is subsequently reduced by the amount of cloud resources utilized by the client computing device.

In accordance with one or more embodiments, when a computing platform grants (re-allocates) cloud resources to a client computing device, the computing platform sends a service credential to the client computing device. The service credential may be a piece of data used by the client computing device to subsequently obtain cloud services.

In accordance with one or more embodiments, the computing platform may generate the service credential by processing one or more parameters associated with the client computing device through a cryptographic function (for example, hash function).

In accordance with one or more embodiments, when a client computing device requests cloud services from the computing platform after cloud resources have been re-allocated to the client computing device, the client computing device presents a valid service credential to the computing platform.

In accordance with one or more embodiments, when a computing platform receives a valid service request for a requested amount of resources that does not exceed available cloud resources for the client computing device, the computing platform obtains the requested amount of resources from one or more cloud providers.

In accordance with one or more embodiments, a computing platform obtains cloud resources from a plurality of cloud service providers in response to a request form a client computing device. The requested amount of cloud resources may be partitioned among the plurality of cloud service providers.

In accordance with one or more embodiments, a first client computing device may sublet a portion of available cloud resources to a second client computing device if approved by a computing platform that previously granted cloud resources to the first client computing device. When the subletting is approved by the computing platform, the computing platform may provide a service credential to the second client computing device so that the second client device may obtain cloud resources through the computing platform. Subletting may be extended to additional tiers, where the second client computing device may further sublet cloud resources to a third client computing device, and so forth.

In accordance with one or more embodiments, available cloud resources may be advertised in a particular marketplace.

In accordance with one or more embodiments, allocation of cloud resources may dynamically change among a plurality of cloud service providers.

In accordance with one or more embodiments, cloud resources may be re-allocated to a client computing device based on a geographic location of the client computing device.

In accordance with one or more embodiments, re-allocated cloud resources for a client computing device may be restricted during a specified time of service.

In accordance with one or more embodiments, a computing platform (for example, a control point or proxy server) may interact with a client computing device through a cloud abstraction layer to provide cloud services to the client computing device. The cloud abstraction layer provides requested cloud services while providing transparency with respect to the cloud service providers supporting the cloud services.

In accordance with one or more embodiments, a cloud abstraction layer includes cloud service handler, cloud distribution, and cloud selection sub-layers. An objective of the service handler sub-layer is to verify a service request from a client computing device. When verified, cloud service handler layer forwards the service request to the cloud distribution sub-layer, which generates a candidate list of cloud service providers that can support the requested cloud service. The cloud distribution sub-layer then forwards the service request with the candidate list to the cloud selection sub-layer. The cloud distribution sub-layer then selects one or more cloud service providers from the candidate list to provide the requested cloud services to the client computing device.

In accordance with one or more embodiments, a plurality of cloud service providers may be included in a candidate list. The cloud selection sub-layer may apportion a service request among the plurality of cloud service providers to provide the requested cloud service to the client computing device.

In accordance with one or more embodiments, a service request may include a first data payload and a service response may include a second data payload. The payloads may be transported through the cloud abstraction layer.

In accordance with one or more embodiments, a service token may be forwarded from a cloud service provider through the cloud abstraction layer so that a client computing device can establish a service session with the cloud service provider to obtain a requested cloud service without further interaction with the cloud abstraction layer.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 12 depicts a data structure mapping cloud service providers to procured cloud services.

FIG. 13 depicts a data structure mapping client computing devices to re-allocated cloud resources.

DETAILED DESCRIPTION

Figure 1:
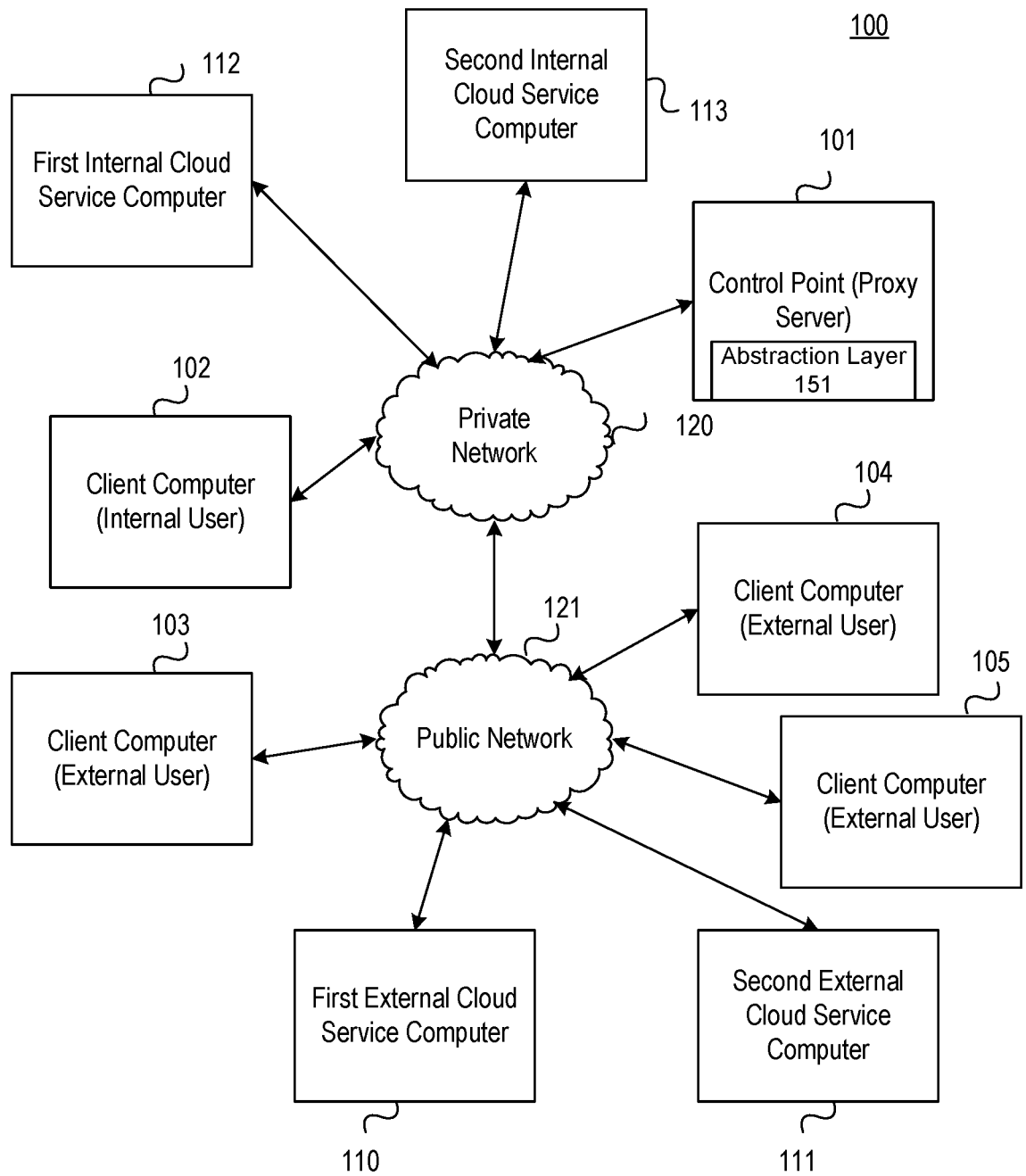
FIG. 1 depicts an illustrative computing environment for utilizing multicomputer processing to provide cloud computing services in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The "cloud" may serve as a base layer for different storage solutions. In accordance with traditional approaches, one picks and chooses one cloud service provider (CSP) over another. One aspect of the disclosure supports a cloud abstraction layer that enables a computer system of a computing entity to lift and shift data across a plurality of cloud service providers. With a digital inventory of cloud resources (data elements), the computer system can create a marketplace of cloud vendors. For example, CSP A may have different attributes than CSP B. The cloud abstraction layer may be able to move between CSP's, where the CSP is selected at run time. The abstract framework may be independent of cloud structure. Thus, if the computer system procured 25 units on CSP A and 25 units on CSP B, the computer system can offer a total of 50 units of cloud data (cloud resources). Later, the computer system may procure more computer resources from one or more CSP's to obtain more resiliency and better pricing. Moreover, cloud resources can be lent to other users that may complement the business objectives of the computing entity.

With an aspect of the disclosure, cloud services may be exposed as offerings.

With an aspect of the disclosure, cloud services may be based on geo-locations.

Some aspects of the disclosure relate to provide cloud computing resources spanning one or more cloud service providers for a user (for example, a client computing device). A computing entity may procure cloud resources from the one or more cloud service providers and re-allocate some of the cloud resources to the user, who may not be directly related to the computing entity.

Aspects of disclosure may be advantageous to a user with respect to traditional approaches. For example, a large computing entity may procure a large amount of cloud resources that a user (for example, a client computing device) cannot directly procure. By the computing entity re-allocating cloud resources to the user, the user may benefit from the economy of scale that the user could not typically achieve. Moreover, the computing entity may be able to procure a diversity of cloud services from different cloud providers in accordance with the needs of the user. Consequently, the user may be able to access different types of cloud services by obtaining those cloud services through the computing entity (for example, via a single control point or proxy server) rather than directly obtaining the cloud services from a single cloud service provider. Also, a user may be able to obtain cloud resources in a transparent manner, where the user may not have explicit knowledge about the cloud service provider(s) supporting the cloud services.

FIG. 1 depicts illustrative computing environment 100 for utilizing multicomputer processing to provide cloud computing services in accordance with one or more example embodiments. Computing environment 100 may include one or more computing devices and/or other computer systems. For example, computing environment 100 may include control point computer (for example, proxy server) 101, internal client computer 102, external client computers 103-105, internal cloud service computers 112-113, and external cloud service computers 110-111.

Cloud computing may be described with respect to the cloud location and/or the type of service that the cloud is providing. Based on a cloud location, one may classify cloud as public, private, hybrid, or community. A public cloud refers to the entire cloud infrastructure being located on the premises of a cloud computing company that offers the cloud service. The location may be separate from the user, who may not have physical control over the infrastructure. A private cloud refers to a cloud infrastructure that is solely by one entity (customer/organization). It is typically not shared with others, yet it may be remotely located. A hybrid cloud refers to both private and public clouds, depending on the purpose. For example, a public cloud can be used to interact with customers, while keeping data secured through a private cloud. A community cloud implies a cloud infrastructure that is shared between organizations, usually with the shared data and data management concerns. For example, a community cloud may belong to a government of a single country. Community clouds may be located both on and off the premises.

Referring to FIG. 1, cloud service computers 112-113 support a private cloud while cloud service computers 110-111 support a public cloud. Typically, only internal users (for example, client computer 102) has access to the private cloud while client computers 102-105 (both internal and external) may access the public cloud through proxy server 101. However, with some embodiments, if a computing entity has a sufficient degree of trust with an external user, the external user may be allowed access to one or more internal cloud service computers 111-112.

In addition, cloud services may be categorized as infrastructure (Infrastructure-as-a-Service (IaaS)), platform (Platform-as-a-Service (PaaS)), software (Software-as-a-Service (SaaS)), or storage. IaaS typically refers to a cloud service offering data storage disks and virtual servers corresponding a computing infrastructure. PaaS refers to a cloud service that offers a development platform, including an operating system, programming language execution environment, database, and web server. SaaS refers to accessing various software applications on a pay-per-use basis as opposed to buying licensed programs. However, the above categories may not always clear-cut, as cloud providers may offer multiple flavors of cloud services, include traditional web or application hosting providers.

Referring to FIG. 1, external cloud service computer 110 may support storage (for example archiving) service and various software applications while external cloud service computer 111 may support infrastructure and software development services.

Computing environment 100 also may include one or more computing platforms. For example, and as noted above, computing environment 100 may include proxy server 101. As illustrated in greater detail below, server 101 may re-allocate procured cloud resources to a user (for example, client computing device 103) by performing one or more of the functions described herein.

Computing environment 100 also may include one or more networks (for example, networks 120 and 121), which may interconnect server 101, client computing devices 102-105, internal cloud service computers 112-113, and external cloud service computers 110-111.

Private network 120 and/or public network 121 may include one or more sub-networks (for example, local area networks (LANs), wide area networks (WANs), or the like). Private network 120 may be associated with a particular organization (for example, a corporation, financial institution, educational institution, governmental institution, or the like) and may interconnect one or more computing devices associated with the organization. For example, proxy server 101, client computing device 102, and cloud service computers 112-113 may be associated with an organization (for example, a computing entity), and private network 120 may be associated with and/or operated by the organization, and may include one or more networks (for example, LANs, WANs, virtual private networks (VPNs), or the like). Public network 121 may connect private network 120 and/or one or more computing devices connected thereto with one or more networks and/or computing devices that are not associated with the organization. For example, cloud service computers 110-111 may be owned, operated, and/or serviced by one or more entities different from the organization that operates private network 120, such as one or more cloud service providers.

With some embodiments, proxy server 101 may support cloud abstraction layer 151 that supports interaction with client computing devices 103-104 for re-allocating cloud services as will be discussed in further detail.

Figure 2:
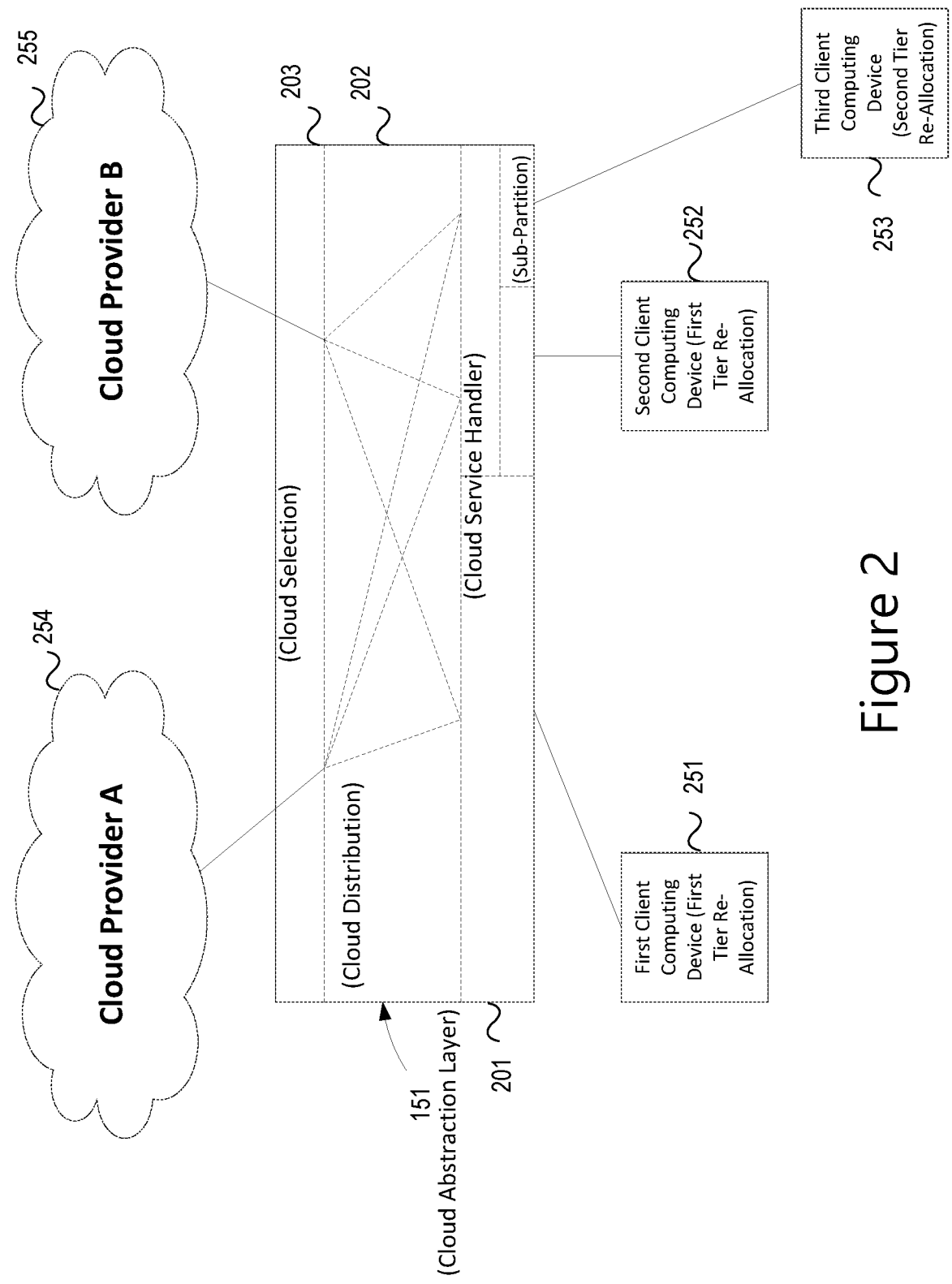
FIG. 2 depicts a cloud abstraction layer that supports the computing environment shown in FIG. 1 in accordance with one or more example embodiments.

FIG. 2 depicts cloud abstraction layer 151 that supports the computing environment shown in FIG. 1 in accordance with one or more example embodiments. With some embodiments, cloud abstraction layer 151 includes cloud service handler sub-layer 201, cloud distribution sub-layer 202, and cloud selection sub-layer 203. Cloud abstraction layer 151 interacts with client computing devices 251-253 so that client computing devices 251-253 may request cloud services from cloud service providers 254-255 in a transparent manner so that a user does not need explicit information about a cloud service provider supporting a cloud service.

Cloud service handler module 201 handles service requests from client computing devices 251-253 and generates service responses to client computing devices 251-253 in response to the service requests.

Cloud service handler module 201 may also partition user space so that privacy (data isolation) is provided to each user. In effect, this approach creates a data fence around each user.

Based on the services requested by client computing devices 251-253, cloud distribution sub-layer 202 determines what cloud providers support those services and generates a corresponding candidate list.

Cloud selection sub-layer 203 receives the candidate list from cloud distribution sub-layer 202 and selects one or more cloud service providers from the candidate list. When cloud selection sub-layer 203 selects a plurality of cloud service providers (for example, cloud service providers 254 and 255), proxy server 101 may obtain first and second portions of cloud resources from cloud service providers 254 and 255, respectively.

As will be discussed, a service request and a service response may each comprise a header and a data payload. For example, a data payload may include data to be stored at a cloud service provider (corresponding to a service request) or may include data retrieved from a cloud service provider (corresponding to a service response). The header may include various parameters. For example, with a service request, the header may include a requested amount of cloud resources and a type of service (for example, storage or software application).

Figure 6:
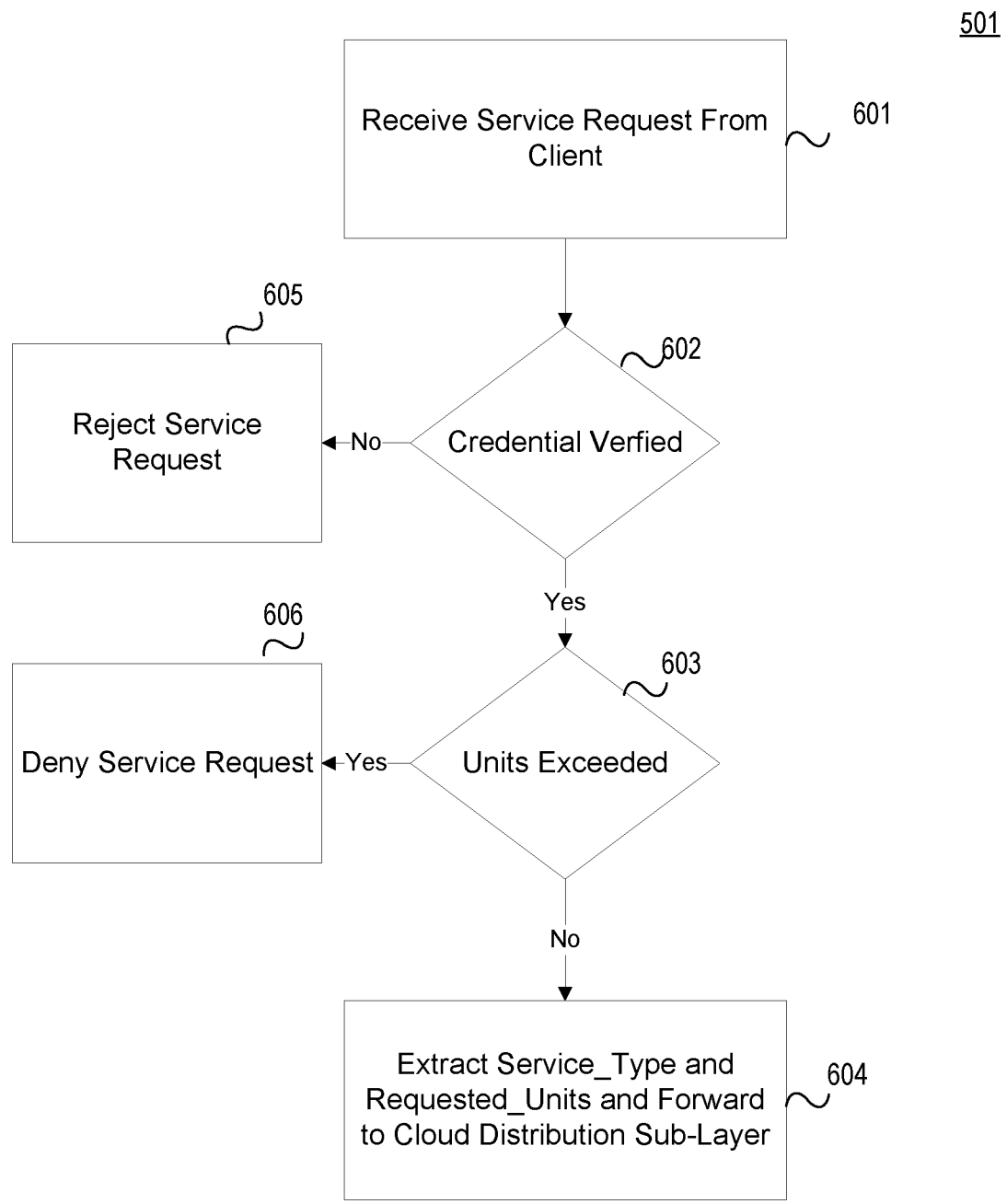
FIG. 6 depicts a flowchart for a cloud service handler sub-layer shown in FIG. 5 in accordance with one or more example embodiments.
Figure 7:
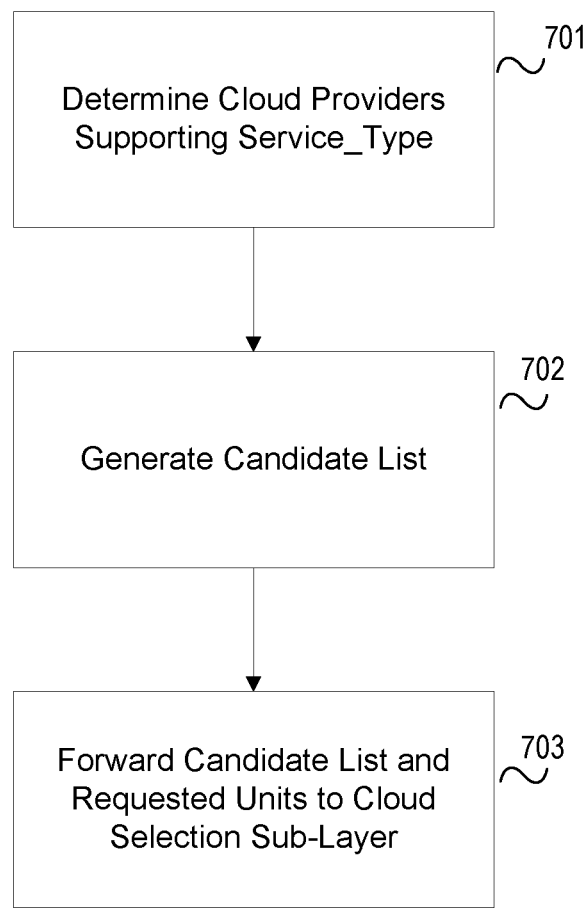
FIG. 7 depicts a flowchart for a cloud distribution sub-layer shown in FIG. 5 in accordance with one or more example embodiments.
Figure 8:
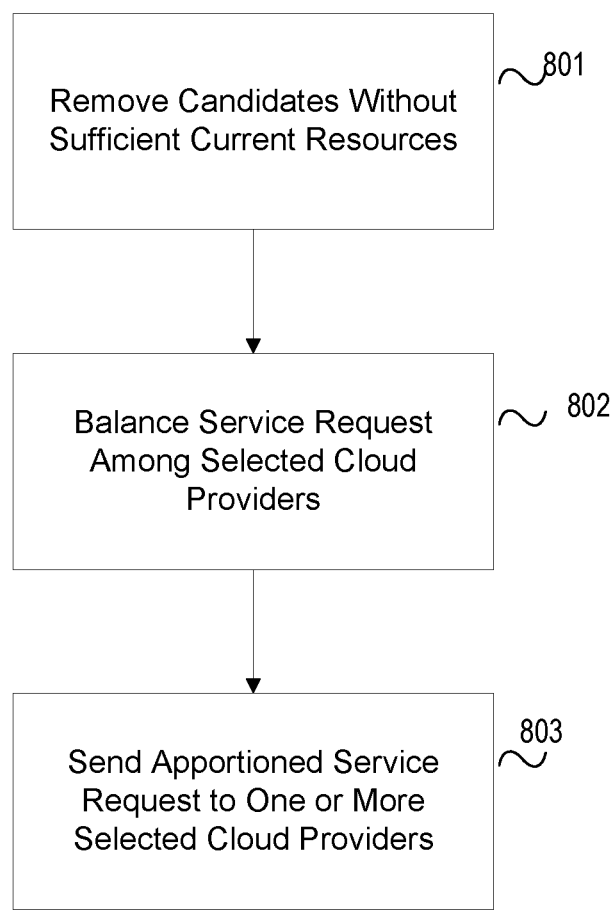
FIG. 8 depicts a flowchart for a cloud selection sub-layer shown in FIG. 5 in accordance with one or more example embodiments.

As will be further discussed, sub-layers 201-203 correspond to flowcharts 501-503 shown in FIGS. 6-8, respectively.

Client computing devices (users) 251-252 are depicted as first tier re-allocation devices because the devices were granted cloud resources directly from proxy server 101. However, embodiments support subleasing of cloud resources (designated as second tier re-allocation). For example, as depicted in FIG. 2, client computing device 253 sublet resources from client computing device 252. Embodiments may further extend the depth of subletting.

While an embodiment of cloud abstraction layer 151 has been discussed above, other embodiments may split functionality differently among sub-layers 201-203 and/or may implement cloud abstraction layer 151 with different sub-layers.

Figure 3:
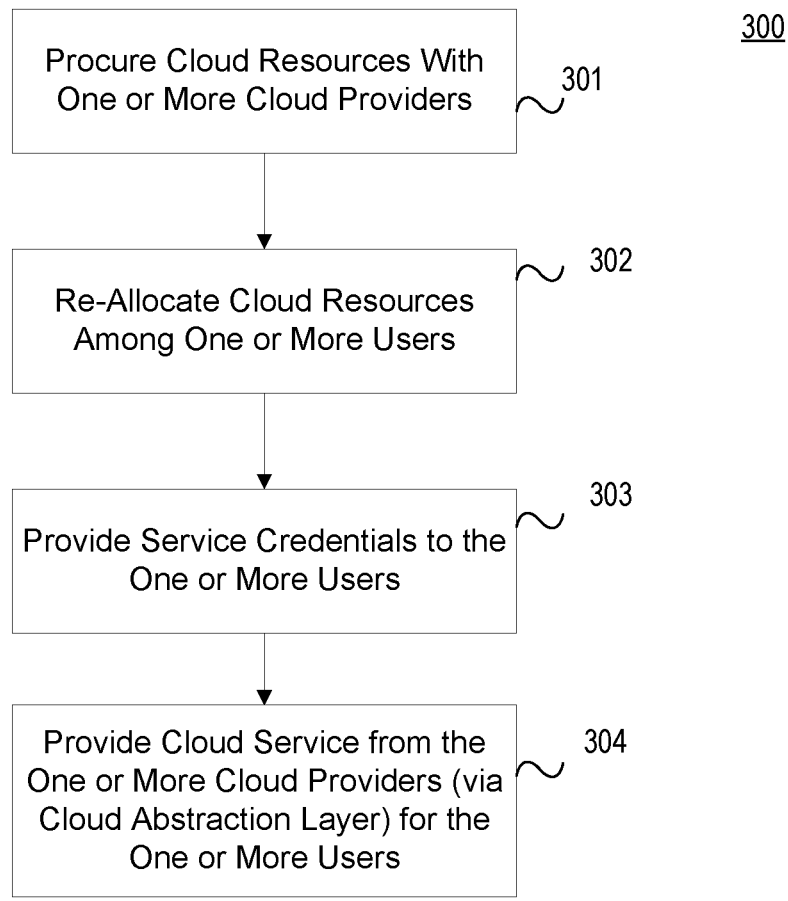
FIG. 3 depicts a flowchart illustrating a method that may be performed by the proxy server shown in FIG. 1 in accordance with one or more embodiments.

FIG. 3 depicts process 300 illustrating a method that may be performed by proxy server 101 shown in FIG. 1 in accordance with one or more embodiments. Process 300 represents a high-level process in which a user (client computing device) requests for cloud resources and obtains cloud services.

At step 301, a computing entity, through proxy server, 101 procures cloud resources from cloud service providers 110 and 111 (as shown in FIG. 1) so that internal users and external users can subsequently request cloud services in a transparent manner. Procurement includes considerations about the anticipated amount of cloud resources that will be needed as well as the types of services that are supported by the cloud service providers. For example, cloud service provider 110 may support only memory storage services while cloud service provider 111 may support only various software applications.

At step 302, the computing entity, through proxy server 101, may re-allocate some of the procured cloud resources to external users 103-105 (as shown in FIG. 1). However, before re-allocating cloud resources, the computing entity typically accounts for anticipated cloud resources that will be needed by internal users such as user 102 (as shown in FIG. 1). As will be discussed with FIG. 4, an external user (corresponding to a client computing device) submits a resource request to proxy server 101 for an initial amount of cloud resources.

At step 303, if the resource request is granted, proxy server 101 provides the client computing device with a service credential. The service credential may be encrypted data that may be presented by the client computing device to obtain subsequent cloud services through proxy server 101. The service credential may be generated from a set of client parameters (for example, client_ID+amount of available cloud resources to client+permitted service type(s)) and processing concatenated parameters through a cryptographic function (for example, a hash function).

At step 404, when the user (the client computing device) desires cloud services, the client computing device presents a service request (typically with the service credential) to proxy server 101 (via cloud abstraction layer 151). If the request is granted, proxy server 101 obtains the requested cloud services from one or more of the cloud service providers (for example, cloud service provider 254 and/or cloud service provider 255). Cloud service providers may be transparent to the requesting user when obtaining cloud resources for the requested service type. For example, the actual cloud service provider(s) providing a cloud resources from one service request to another service request may change and may be transparent to the requesting client computing device as long as cloud resources are provided for the requested service type.

While the actual cloud service provider may not be pertinent to the client computing device when requesting some cloud services, there may be situations where that is not the case. For example, the client computing device may request storage of a data file, which is physically stored at cloud service provider 255, for example. The client computing device typically does not specify the particular cloud service provider that actually stores the data. However, the stored data file needs to be accessed from the same cloud service provider that actually stores the data file. Consequently, when the client computing device requests storage of data, proxy server 101 may include an identification (such as an alias) in the service response so that data can be subsequently retrieved from the same cloud service provider that stores the data. When the client computing device subsequently requests that the stored data be accessed, it may include the identification in the corresponding service request.

Figure 4:
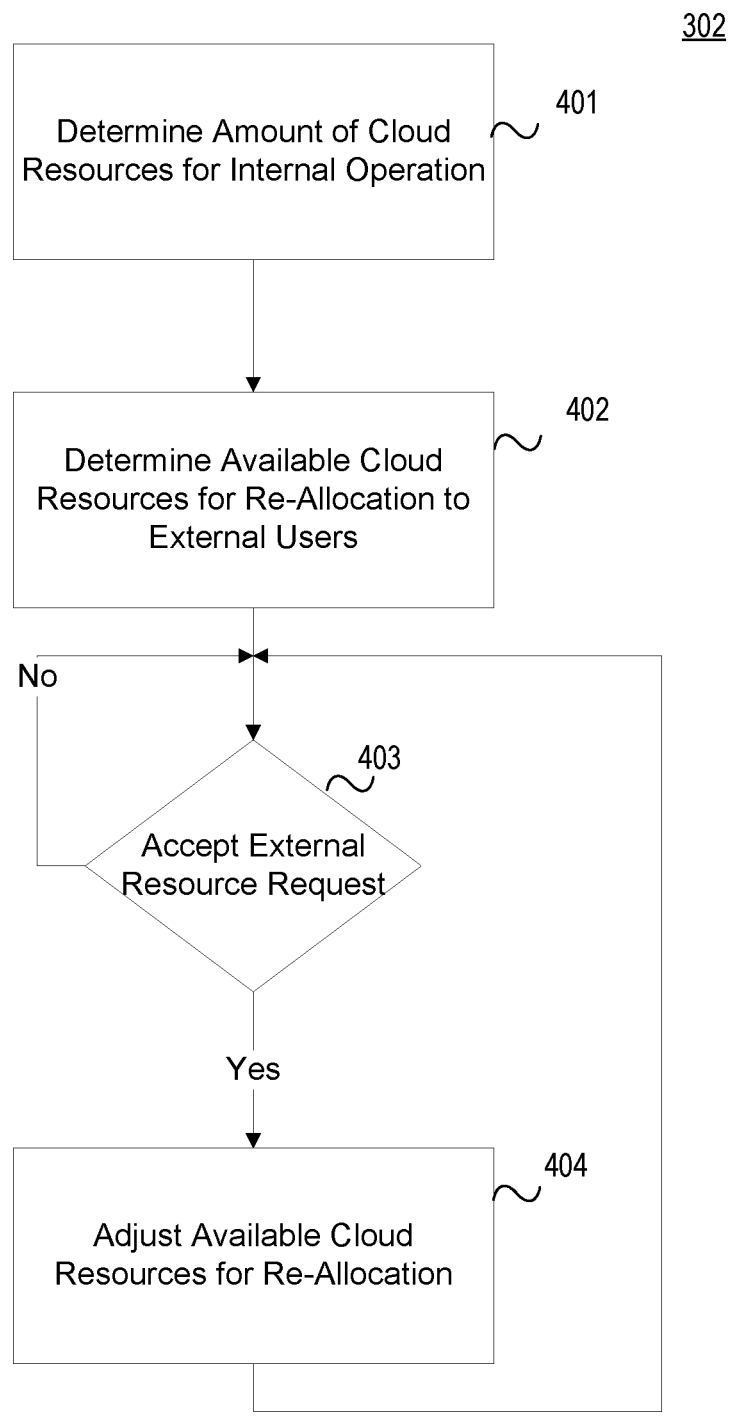
FIG. 4 depicts a flowchart illustrating a method that may be performed by the proxy server shown in FIG. 1 in accordance with one or more embodiments.

FIG. 4 depicts flowchart 302 illustrating a method that may be performed by the proxy server shown in FIG. 1 in accordance with the process shown in FIG. 3.

At step 401, proxy server 101 of a computing entity determines a procured amount of cloud resources needed for internal operation (for example, including client computing device 102 as shown in FIG. 1). However, proxy server 101 may procure more cloud resources than anticipated for internal use for various reasons. For example, computing entity may obtain better pricing for a larger amount.

At step 402, proxy server 101 determines an amount of cloud resources that can be re-allocated to external users (for example, client computing devices 403-405). For example, proxy server 101 may subtract the amount for internal use plus a margin of error from the procured amount.

When an external computing device requests that a requested amount of cloud services be re-allocated, proxy server 101 may accept the resource request at step 403. If so, proxy server 101 adjusts the amount of available cloud resources that may be re-allocated for subsequent resource requests at step 404.

Figure 5:
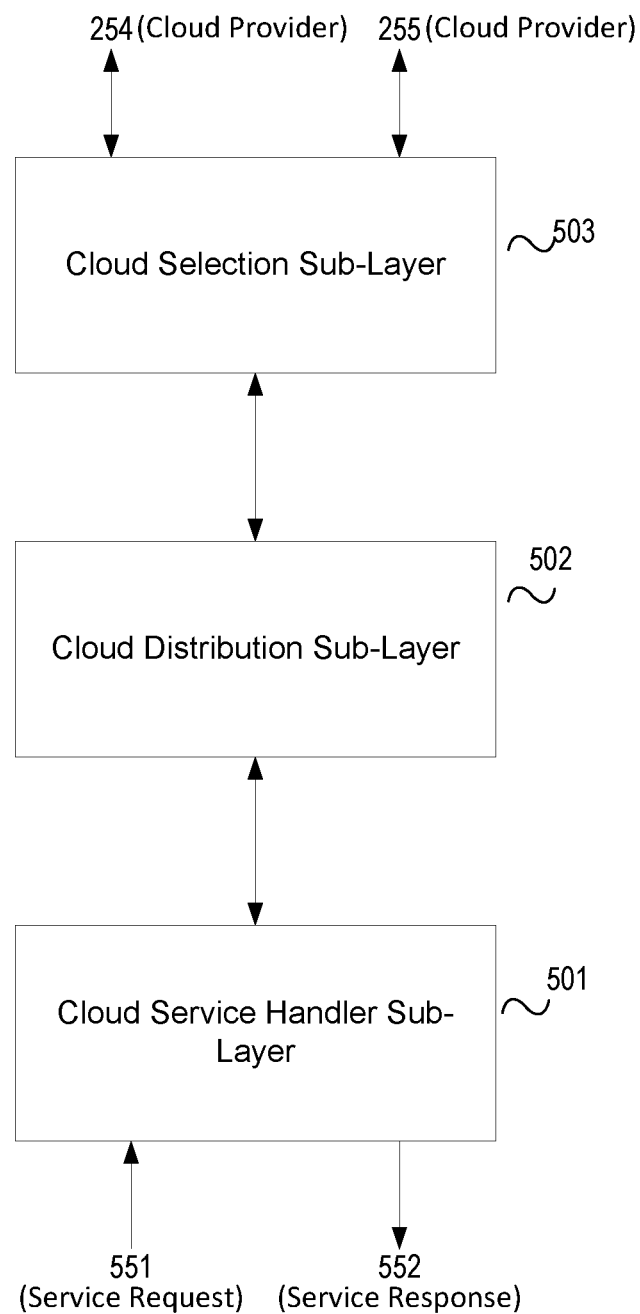
FIG. 5 depicts a flowchart that characterizes the cloud abstraction layer as shown in FIG. 2 in accordance with one or more embodiments.

FIG. 5 depicts flowchart 304 that characterizes cloud abstraction layer 151 as shown in FIG. 2 in accordance with one or more embodiments. With some embodiments, cloud abstraction layer 151 comprises cloud service handler sub-layer 501, cloud distribution sub-layer 502, and cloud selection sub-layer 503. As will be discussed in further detail, service request 551 from a client computing device is initially processed by cloud service handler sub-layer 501, which then forwards the processed service request to cloud distribution sub-layer 502. The further processed service request is then forwarded to cloud selection sub-layer 503, which then sends the processed request to one or more selected cloud service providers 254,255.

In response to a service request, the selected cloud service provider 254,255 returns a service response that is processed by sub-layers 503, 502, and 501, respectively, thus providing service response 552 to the client computing device. For example, an accessed data block may be provided that was previously stored for the client computing device.

As previously discussed, service request 551 and service response 552 may each comprise a header and a data payload. For example, a data payload may include data to be stored at a cloud service provider (corresponding to a service request) or may include data retrieved from a cloud service provider (corresponding to a service response). As another example, a data payload associated with service response 552 may represent text and/or video output of a software application. The header may include various parameters. For example, with a service request the header may include a requested amount of cloud resources and a type of service (for example, storage or software application).

With some embodiments, cloud abstract layer 151 may transport the data payload. However, when the data payload is sufficiently large, it may be more efficient to transport the data payload via a different/separate path from the rest of the service request or service response. As will be further discussed, a service token may be provided via cloud abstract layer 151 to a client computing device. With this approach, the client computing device can establish a communication connection directly between the client computing device and the selected cloud service provider by presenting the service token so that the requested cloud services can be provided to the client computing device.

With some embodiments, a data payload may be transported by cloud abstract layer 151 when the size of the payload less than a predetermined size. Otherwise, the data payload may be transported via a separate path as described above.

Cloud service handler sub-layer 501, cloud distribution sub-layer 502, and cloud selection sub-layer 503 are discussed in further detail with FIGS. 6, 7, and 8, respectively.

FIG. 6 depicts a flowchart for cloud service handler sub-layer 501 shown in FIG. 5 in accordance with one or more example embodiments.

At step 601, a client computing device submits a service request for cloud service to proxy server 101. With some embodiments, the service request may include various parameters and a data payload. The parameters may include a requested amount of cloud resources (for example, measured in units). With some embodiments, the service request includes a service credential that the client computing device previously obtained from proxy server 101 in response to a granted resource request. If so, the submitted service credential is verified by cloud service handler sub-layer 501 at step 602. If cloud service handler sub-layer 501 determines that the service credential is valid, cloud service handler sub-layer 501 continues to process the service request. Otherwise, the service request is rejected at step 605.

With some embodiments, the service credential may be encrypted based on various parameters including the amount of available cloud resources remaining for the client computing device. If so, proxy server 101 (via cloud service handler sub-layer 501) may modify the service credential when the available amount changes and return the modified service credential to the client computing device for subsequent service requests.

At step 603 cloud service handler sub-layer 501 determines whether the request amount of cloud resources exceeds the available amount remaining for the client computing device. If so, the service request is denied at step 606.

At step 604, cloud service handler sub-layer 501 extracts the requested service type (for example, storage, infrastructure, development platform, and/or software applications) and the requested amount of cloud resources, and forwards the processed service request to cloud distribution sub-layer 502.

FIG. 7 depicts flowchart 502 for a cloud distribution sub-layer shown in FIG. 5 in accordance with one or more example embodiments.

At step 701 cloud distribution sub-layer 502 determines what cloud service providers (for example, cloud providers 254 and 255 as shown in FIG. 2) can support the request service types. Cloud distribution sub-layer 502 then generates a candidate list of cloud service providers at step 702 and forwards the processed service request to cloud selection sub-layer 503 at step 703. With some embodiments, the processed service request may include a data payload.

FIG. 8 depicts flowchart 503 for cloud selection sub-layer 703 shown in FIG. 5 in accordance with one or more example embodiments.

At step 801 cloud selection sub-layer 503 receives and processes the candidate list obtained from cloud distribution sub-layer 502. With some embodiments, cloud selection sub-layer 503 may remove a candidate from the list because not enough cloud resources are available from the candidate service provider to satisfy the requested cloud resources contained in the service request. However, with some embodiments cloud selection sub-layer 503 may balance the service request among a plurality of candidates at step 802. For example, when some of the candidates cannot individually provide enough cloud resources, cloud resources can be combined from a combination of cloud service providers. Extending the example, one portion of a data block may be stored at service provider A and another portion of the data block may be stored at service provider B as performed at step 803.

As discussed above, sub-layers 501-503 process a service request from a client computing device. Also, sub-layers 501-503 may process a response from cloud service providers in order to deliver a cloud service to the client computing device. For example, sub-layers 501-503 may deliver accessed data that was previously stored or processed data from a software application.

While cloud services may be provided in two stages (for example, re-allocating cloud resources followed by responding to a service request), some embodiments may do so in one stage. For example, a service request may implicitly request for a necessary amount of cloud resources to support the requested cloud service.

Figure 9:
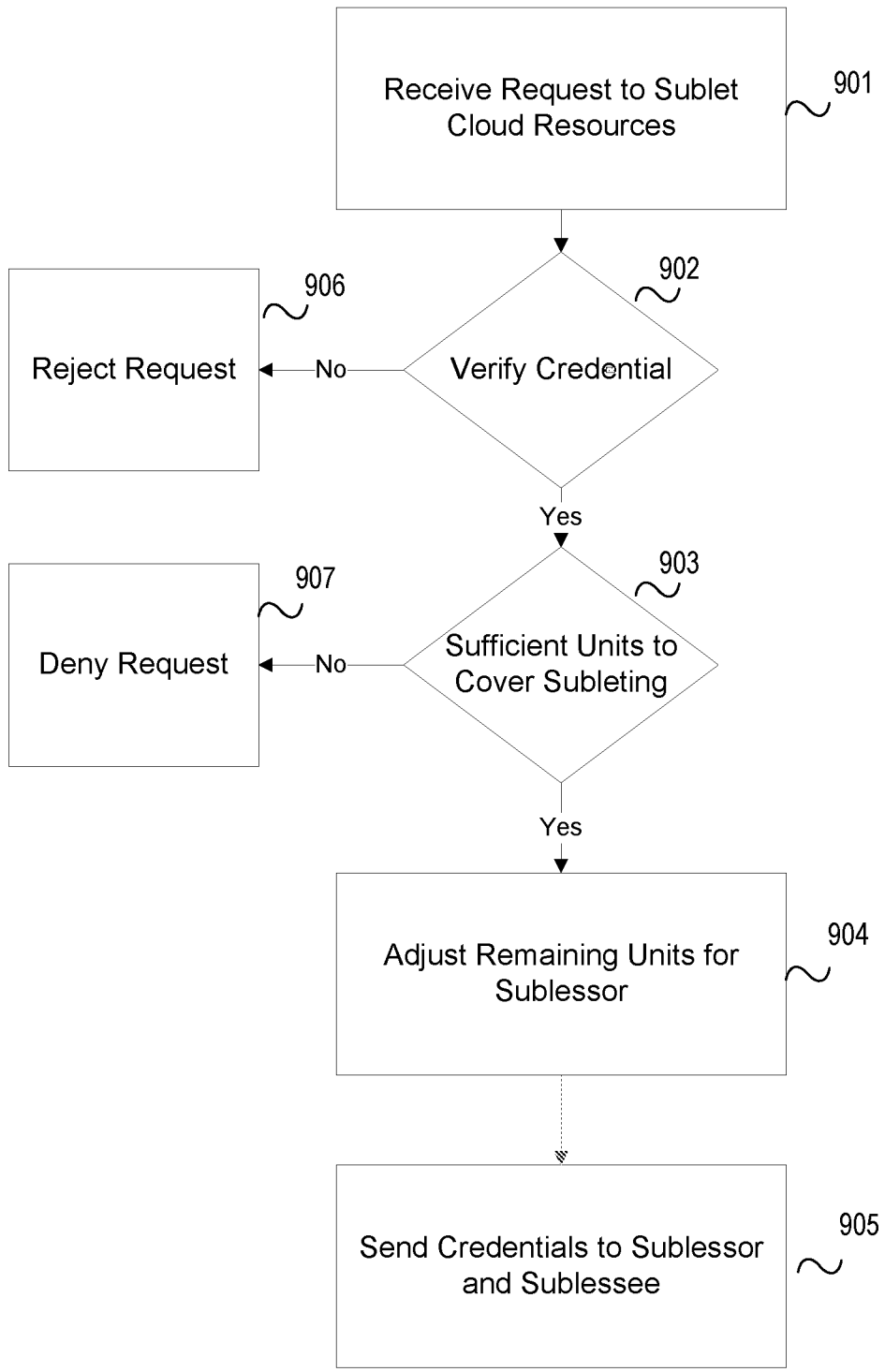
FIG. 9 depicts a flowchart for subletting cloud resources that may be performed by the proxy server shown in FIG. 1 in accordance with one or more embodiments.

FIG. 9 depicts flowchart 900 for subletting cloud resources that may be performed by proxy server 101 shown in FIG. 1 in accordance with one or more embodiments. As discussed with FIG. 4, a user (client computing device) may have cloud resources re-allocated by proxy server 101. Referring to FIG. 2, re-allocation of cloud resources directly from a computing entity (via proxy server 101) may be referred as first tier re-allocation (as shown with user 252). Moreover some embodiments may support the ability of user 252 to sublease some or all of the re-allocated cloud resources to user 253 (which may be referred as second tier re-allocation).

Referring back to FIG. 9, at step 901 a client computing device (sublessor) requests to sublet cloud resources to another client computing device user (sublessee). The request may include various parameters including an amount of cloud resources being sublet and an identification of the user that the cloud resources are being sublet to. With some embodiments, the subletting must be approved in order to sublet the cloud resources so that the computing entity can control who is using cloud resources through proxy server 101. For example, the computing entity may not want a competing entity from accessing cloud resources procured by the computing entity.

At step 902, proxy server 101 verifies the service credential (which was previously issued when the user was granted re-allocated cloud resources) of the computing computer device. If the service credential is not valid, the subletting request is rejected at step 906.

At step 903, proxy server 101 determines whether the client computing device has enough available amount cloud resources to cover the amount that is being sublet. While the available amount may be determined from the encrypted service credential, some embodiments may map the available amount to the client computer device in a data structure (not explicitly shown). If the client computing device does not have enough cloud resources to cover the subletting, the request is denied by proxy server 101 at step 907.

At step 904, proxy server 101 reduces the available resource units for the sublessor by the amount of resources being sublet. A service credential is provided to the sublessee at step 905. With some embodiments, a modified service credential may be provided to the sublessor when the service credential is at least partially based on the available units of cloud resources.

Figure 10:
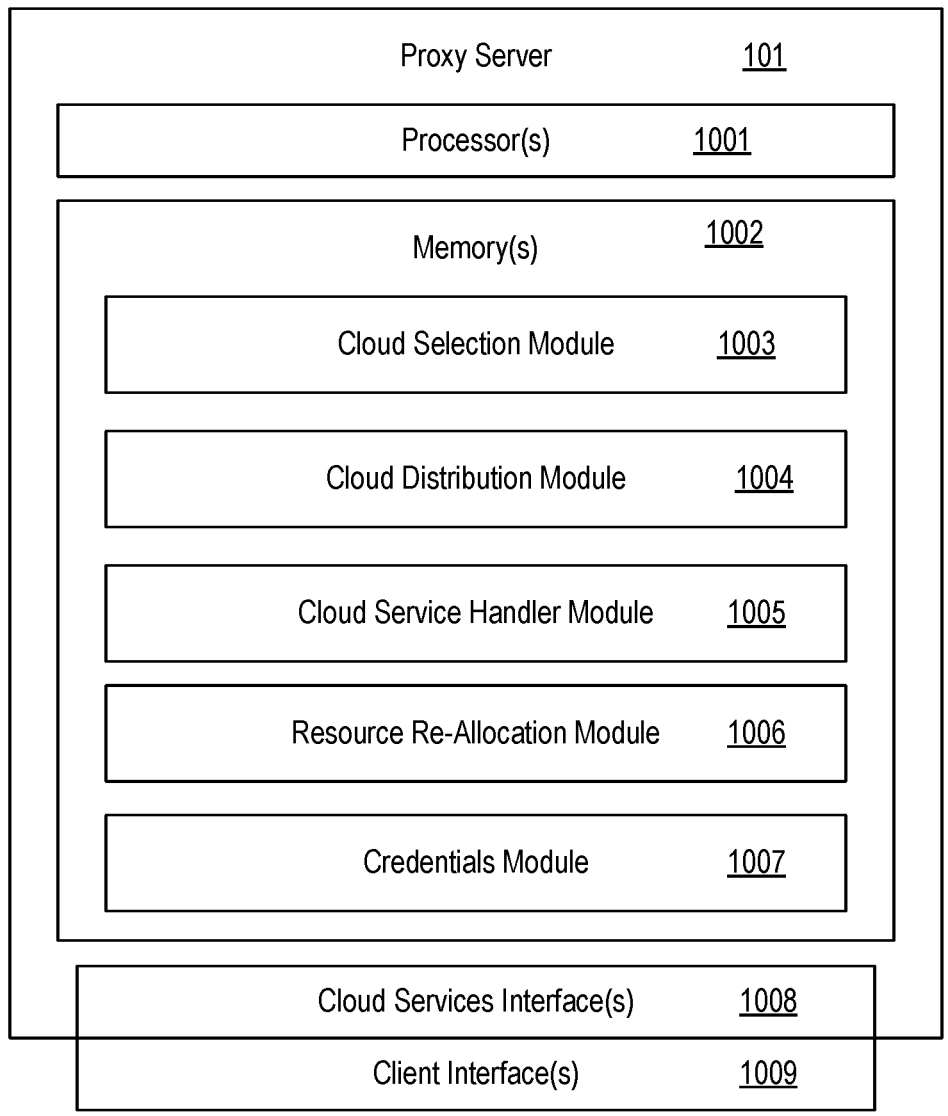
FIG. 10 depicts an illustrative proxy server that supports the computing environment shown in FIG. 1 in accordance with one or more example embodiments.

FIG. 10 depicts illustrative proxy server 101 that supports the computing environment shown in FIG. 1 in accordance with one or more example embodiments. Proxy server 101 may include one or more processors 1001, memory 1002, cloud service interface 1008, and client interface 1009. A data bus may interconnect processor(s) 1001, memory 1002, and communication interfaces 1008-1009.

Cloud services interface 1008 may be a network interface configured to support communications between proxy server 101 and cloud service computers 110-113 when obtaining cloud resources and services. Client interface 1009 may be a network interface configured to support communications between proxy server 101 and client computing devices 102-105. Corresponding messaging will be further discussed with FIGS. 11A-E.

Memory 1002 may include one or more program modules having instructions that when executed by processor(s) 201 cause event tracking server 101 to perform one or more functions described herein and/or one or more databases that may store and/or otherwise maintain information which may be used by such program modules 1003-1007 and/or processor(s) 201. In some instances, the one or more program modules and/or databases may be stored by and/or maintained in different memory units of proxy server 101 and/or by different computing devices that may form and/or otherwise make up proxy server 101. For example, memory 202 may have, store, and/or include cloud selection module 1003, cloud distribution module 1004, cloud service handler module 1005, resource re-allocation module 1006, and credentials module 1007.

Cloud service handler module 1005, cloud distribution module 1004, and cloud selection module 1003 may comprise computer-executable instructions that direct and/or cause proxy server 101 to support sub-layers 201-203, respectively as shown in FIG. 2, of cloud abstraction layer 151 as previously discussed with FIGS. 2 and 5.

Resource re-allocation module 1006 may comprise computer-executable instructions that direct and/or cause proxy server 101 to re-allocate cloud resources to a client computing device as discussed with FIG. 4.

Credentials module 1007 may comprise computer-executable instructions that direct and/or cause proxy server 101 to generate a service credential for a client computing device when cloud resources have been re-allocated to the client computing device. The client computing device may subsequently present the service credential when requesting cloud services through proxy server 101. Credentials module 1007 may generate the service credential by processing various parameters (for example, by concatenating parameters client ID and available units of cloud resources for the client computing device) through a hashing function.

With some embodiments, modules 1003-1007 may be embodied in computer-executable code that is stored in one or more memory devices (for example, memory 1002) and executed by one or more computer devices (for example, processor 1001) and/or embodied in hardware/firmware components such as integrated circuits, application-specific integrated circuits (ASICs), field executable gate arrays, and the like.

FIGS. 11A-11E depict an illustrative event sequence for multicomputer processing within the computing environment shown in FIG. 1 in accordance with one or more example embodiments.

Figure 11A:
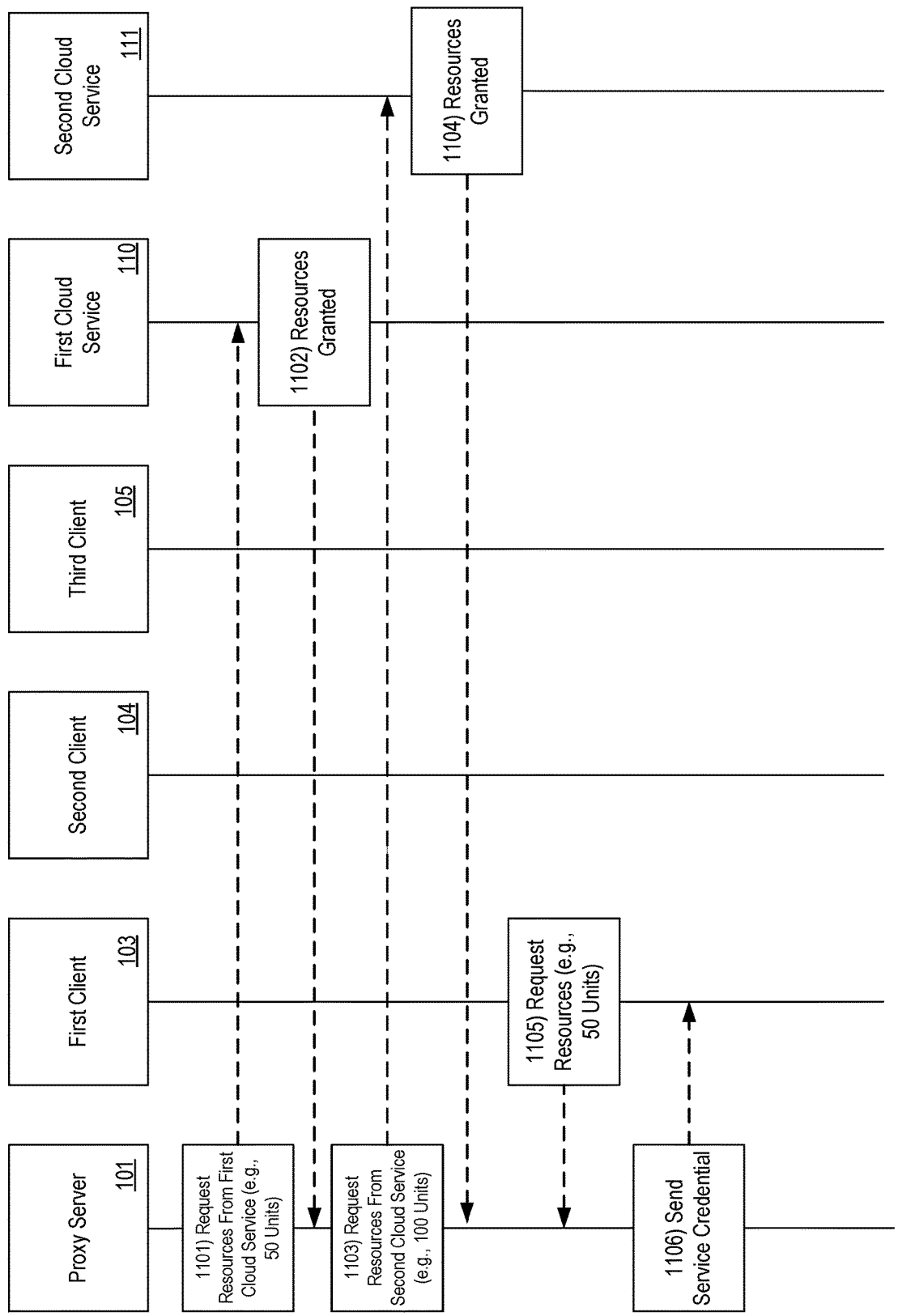
FIGS. 11A-11E depict an illustrative event sequence for multicomputer processing within the computing environment shown in FIG. 1 in accordance with one or more example embodiments.

Referring to FIG. 11A, proxy server 101 (corresponding to a computing entity) procures cloud resources from cloud service providers 110-111 at steps 1101-1104. As an example, 50 units and 100 unit are procured from cloud service providers 110 and 111, respectively. The procured cloud resources (150 units) may be subsequently expended for usage within the computing entity and/or re-allocation to external users.

At step 1105, first client computing device 103 requests 50 units. Proxy server 101 accepts the resource request and returns a service credential to first client computing device 103 at step 1106. First client computing device 103 will subsequently present the service credential when it requests cloud services from proxy server 101. The computing entity now has 100 units that can be used for internal usage and/or re-allocation.

With some embodiments, the service credential may be generated by encrypting various parameters including the amount available units and may be regenerated when the amount of available units changes.

Figure 11B:
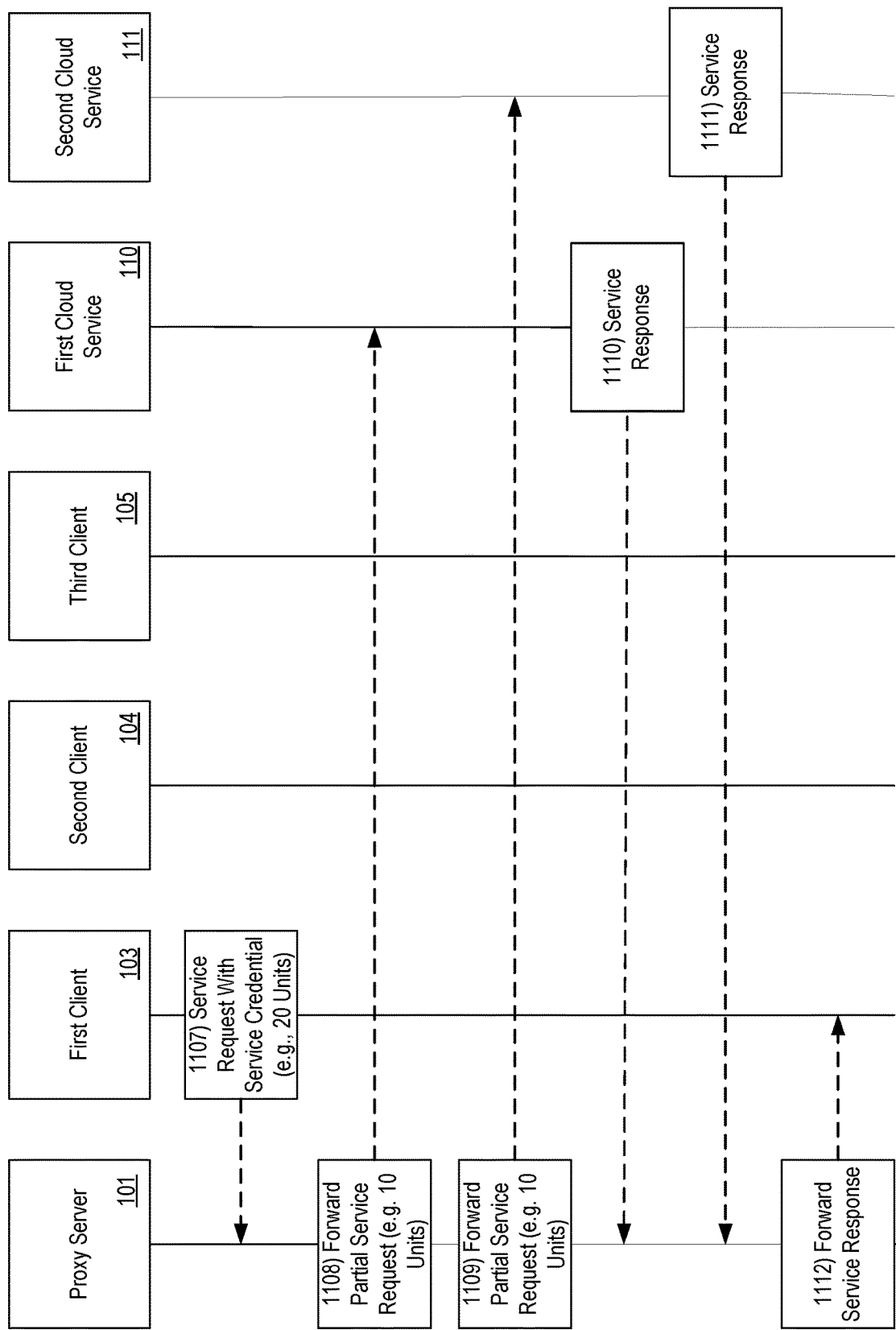

Referring to FIG. 11B, first client computing device 103 submits a service request for 20 units of cloud service at step 1107. The satisfy this request, proxy server 101 obtains 10 units of resources from first cloud service provider 110 and 10 units of resources from second cloud service provider 111 at steps 1108 and 1109, respectively. When the service requests are acknowledged at steps 1110-1111, proxy server 101 returns a service response to first client computing device 103. Subsequently, first client computing device 103 has 30 units of available cloud resources because 20 units have been expended for the requested cloud service.

Figure 11C:
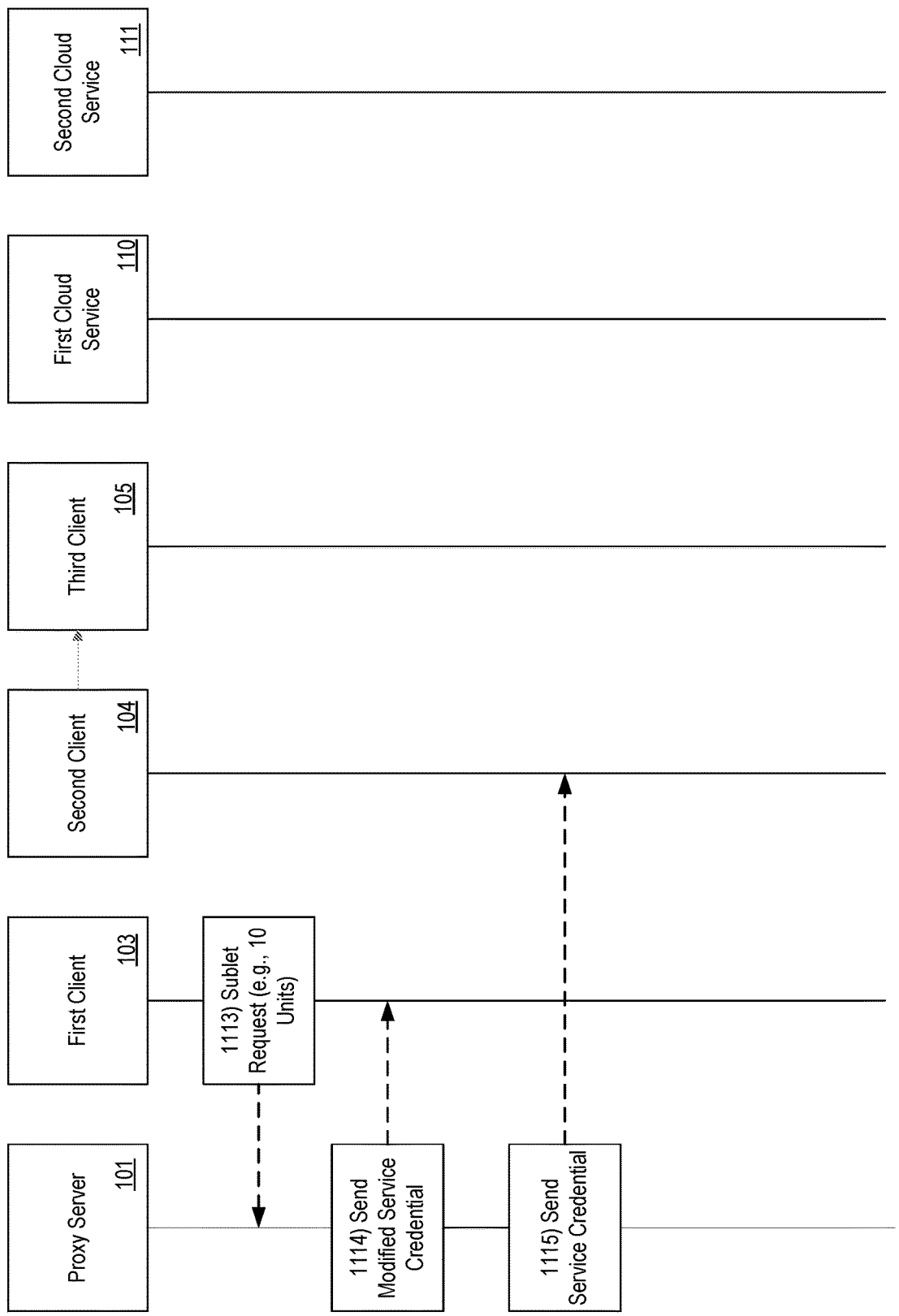
Figure 11D:
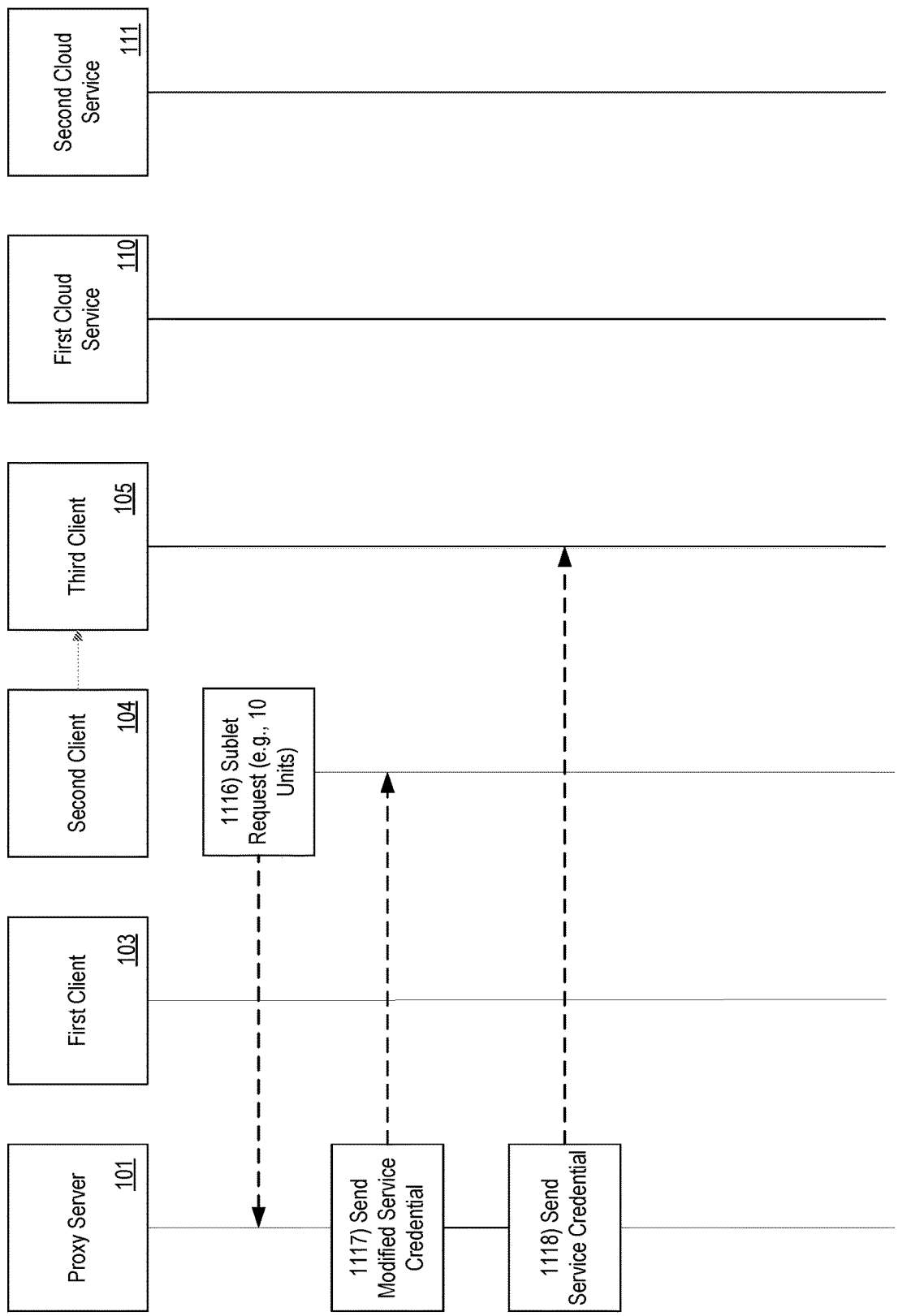

Referring to FIG. 11C, first client computing device 103 submits a request to sublet 10 units of its available 30 units to second client computing device 104. Proxy server 101 accepts the request and sends a modified service credential (to reflect the changed amount of available units) at step 1114 and another service credential to second client computing device 105 so that it can submit a service request. First client computing device 103 now has 20 available units and second client computing device 104 has 10 units.

With some embodiments, subletting may occur at further levels. For example, referring to FIG. 11D, second client computing device 104 requests to sublet 5 units of its 10 available units at step 1116. Proxy server 101 accepts the request and sends a modified service credential to second client computing device 104 and another service credential to third client computing device 105 at steps 1117 and 1118, respectively. First client computing device 103 now has 20 units while second and third computing devices 104 and 105 both have 5 units.

Figure 11E:
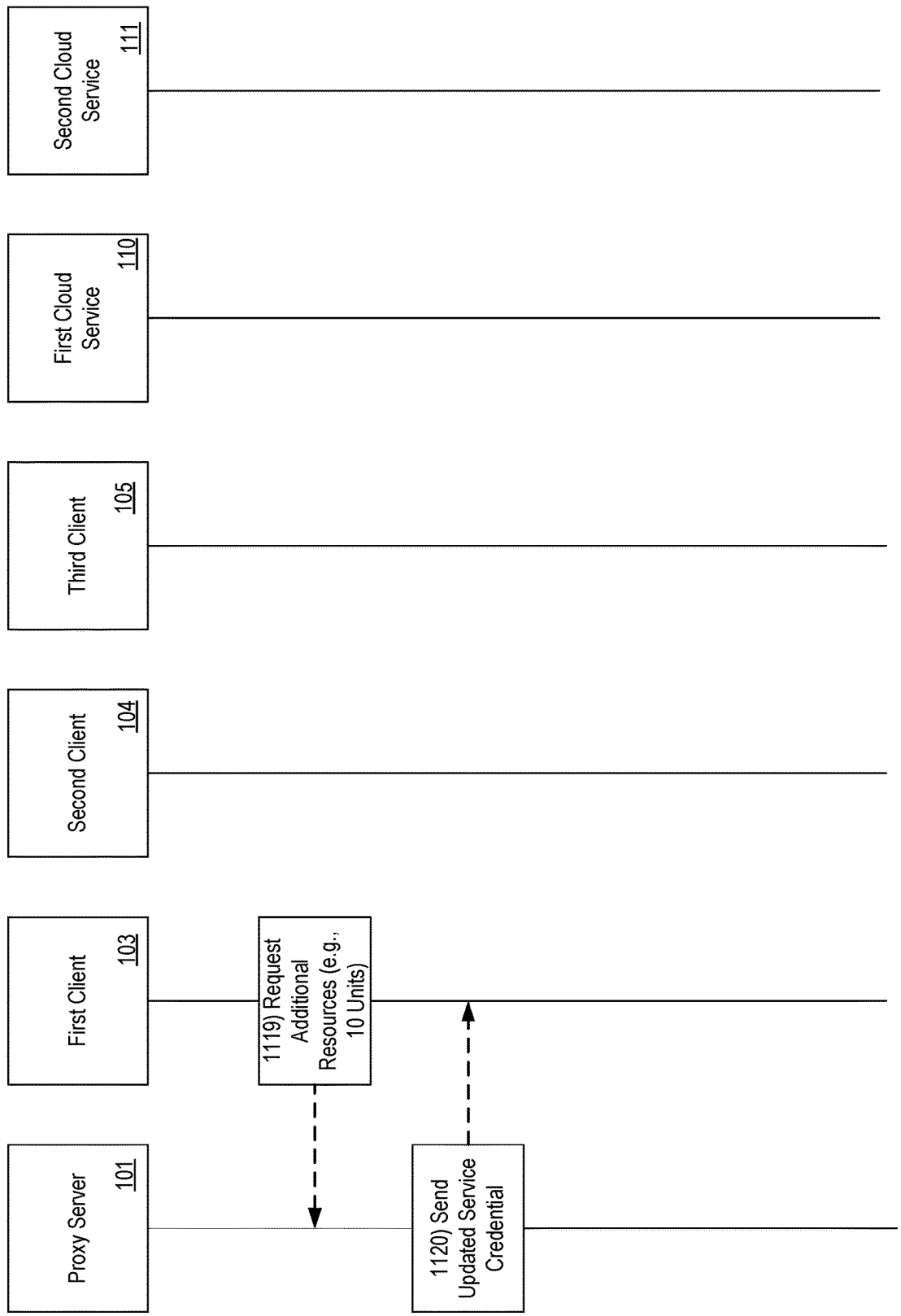

With some embodiments, a client computing device may request for additional cloud resources. Referring to FIG. 11E, first client computing device 103 requests for 10 additional units at step 1119. When proxy server 101 accepts the request at step 1120, first client computing device 103 now has 30 available units while the computing entity has 90 units.

FIG. 12 depicts data structure 1200 mapping cloud service providers 1201 to procured cloud services. The procured cloud services may be specified by procured units of service 1202 and an associated type of service 1203. In the example shown in FIG. 12, different types of service may be specified, including storage with different access rates, different software applications, development, and infrastructure. Data structure 1200 may be accessed by proxy server 101 when re-allocating resources to client computing devices to verify that enough cloud resources are available.

FIG. 13 depicts data structure 1300 mapping client computing devices 1301 to re-allocated cloud resources 1301. Additional service attributes may be included, including type of service 1303 and activation time 1304. For example, cloud resources for a client computing device may be available during prime hours (weekdays from 0900-1700), non-prime hours, or all times. Data structure 1300 may be accessed by proxy server 101 when determining whether a client computing device has sufficient available cloud resources when requesting for a cloud service.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (for example, air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (for example, a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a cloud services interface communicatively coupled to the at least one processor with one or more cloud service providers, wherein the one or more cloud service providers includes a first cloud service provider and a second cloud service provider;
   a client interface coupled to the at least one processor with one or more client computing devices;
   a cloud service handler module storing computer-readable instructions that, when executed by the at least one processor, cause the computing platform to perform:
      when a service request from a client computing device is received through the client interface, extracting a plurality of service types, an identification of the client computing device, and a requested amount of cloud resources, wherein the plurality of service types includes a first service type and a second service type; and
      when the requested amount of cloud resources does not exceed a remaining amount of cloud resources remaining for the client computing device, forwarding the service request with the extracted plurality of service types and the extracted requested amount of cloud resources to a cloud distribution module, wherein the remaining amount of cloud resources is remaining from a previously procured amount from the one or more cloud service providers;
   a cloud distribution module storing computer-readable instructions that, when executed by the at least one processor, cause the computing platform to perform:
      generating a candidate list of cloud service providers supporting the extracted plurality of service types, wherein the candidate list includes the first cloud service provider and the second cloud service provider; and
      forwarding the service request with extracted request amount and the candidate list to a cloud selection module; and
   a cloud selection module storing computer-readable instructions that, when executed by the at least one processor, cause the computing platform to perform:
      initially selecting the first cloud service provider from the candidate list;
      additionally selecting the second cloud service provider from the candidate list, wherein a selected at least one cloud service provider comprises the first cloud service provider and the second cloud service provider, wherein the first cloud service provider supports the first service type and not the second service type and the second cloud service provider supports the second service type and not the first service type, and wherein the first service type and the second service type are different; and forwarding, through the cloud services interfaces, the service request to the selected at least one cloud service provider, wherein the selected at least one cloud service provider provides requested cloud resources to the client computing device.

2. The computing platform of claim 1, wherein the cloud service handler module storing computer-readable instructions that, when executed by the at least one processor, further cause the computing platform to perform:
extracting a service credential from the service request;
when the service credential is valid, proceeding to provide cloud services for the client computing device; and
when the service credential is invalid, rejecting the service request.

3. The computing platform of claim 1, wherein the cloud service handler module storing computer-readable instructions that, when executed by the at least one processor, further cause the computing platform to perform:
reducing the remaining amount of cloud resources for the client computing device by the requested amount.

4. The computing platform of claim 1, wherein the cloud service handler module storing computer-readable instructions that, when executed by the at least one processor, further cause the computing platform to perform:
when the requested amount of cloud resources exceeds the remaining amount for all users, denying the service request.

5. The computing platform of claim 1, wherein the cloud distribution module storing computer-readable instructions that, when executed by the at least one processor, further cause the computing platform to perform:
when the service request specifies only a single cloud service provider, including only the single cloud service provider in the candidate list.

6. The computing platform of claim 1, wherein the cloud selection module storing computer-readable instructions that, when executed by the at least one processor, further cause the computing platform to perform:
removing, from the candidate list, any cloud service providers supporting an insufficient amount of cloud resources.

7. The computing platform of claim 1, wherein the cloud selection module storing computer-readable instructions that, when executed by the at least one processor, further cause the computing platform to perform:
balancing service requests between the first and second cloud service providers.

8. The computing platform of claim 1, wherein:
the service request includes a header and a first data payload;
the cloud service handler module storing computer-readable instructions that, when executed by the at least one processor, further cause the computing platform to perform forwarding the first data payload to the cloud selection module through the cloud distribution module; and
the cloud selection module storing computer-readable instructions that, when executed by the at least one processor, further cause the computing platform to perform forwarding the first data payload to the at least one cloud service provider.

9. The computing platform of claim 1, wherein:
the cloud selection module storing computer-readable instructions that, when executed by the at least one processor, further cause the computing platform to perform forwarding a service response from the at least one cloud service provider to the cloud service handler module through the cloud distribution module.

10. The computing platform of claim 9, wherein the service response includes a second data payload.

11. The computing platform of claim 1, wherein:
the cloud selection module storing computer-readable instructions that, when executed by the at least one processor, further cause the computing platform to perform forwarding a service token from the at least one cloud service provider to the cloud service handler module through the cloud distribution module, wherein the service token enables the client computing device to establish an initial service session and directly communicate with the selected at least one cloud service provider for the requested amount of cloud resources via a different path from a reminder of the service request.

12. The computing platform of claim 1, wherein the cloud service handler module storing computer-readable instructions that, when executed by the at least one processor, further cause the computing platform to perform:
when the extracted service type equals a first service type, allowing the service request from the client computing device only during a first activation time duration; and
when the extracted service type equals a second service type, allowing the service request from the client computing device only during a second activation time duration, wherein the first and second activation time durations are different.

13. The computing platform of claim 1, wherein the cloud service handler module storing computer-readable instructions that, when executed by the at least one processor, further cause the computing platform to perform:
when the first cloud service provider does not have sufficient cloud resources to support the first service type requested by the service request, combine cloud resources from a third cloud service provider and the first cloud service provider to provide enough cloud resources to support the requested first service type.

14. A method for providing cloud resources through a control point, the method comprising:
when a service request from a client computing device is received at a cloud service handler sub-layer, extracting a plurality of service types, an identification of the client computing device, and a requested amount of cloud resources, wherein the plurality of service types includes a first service type and a second service type;
when the requested amount of cloud resources does not exceed a remaining amount of cloud resources remaining for the client computing device, forwarding, at the cloud service handler sub-layer, the service request with the extracted plurality of service types and the extracted requested amount of cloud resources to a cloud distribution sub-layer, wherein the remaining amount of cloud resources is remaining from a previously procured amount from one or more cloud service providers;
generating, at the cloud distribution sub-layer, a candidate list of cloud service providers supporting the extracted plurality of service types, wherein the candidate list includes a first cloud service provider and a second cloud service provider;
forwarding, at the cloud distribution sub-layer, the service request with extracted request amount and the candidate list to a cloud selection sub-layer;

initially selecting the first cloud service provider from the candidate list;

additionally selecting the second cloud service provider from the candidate list, wherein a selected at least one cloud service provider comprises the first cloud service provider and the second cloud service provider, wherein the first cloud service provider supports the first service type and not the second service type and the second cloud service provider supports the second service type and not the first service type, and wherein the first service type and the second service type are different; and forwarding, at the cloud selection sub-layer, the service request to the first and second service providers, wherein the first and second service providers provide requested cloud resources to the client computing device.

15. The method of claim 14, further comprising:

extracting, at the cloud service handler sub-layer, a service credential from the service request;

when the service credential is valid, proceeding, at the cloud service handler sub-layer, to provide cloud services for the client computing device; and when the service credential is invalid, rejecting, at the cloud service handler sub-layer, the service request.

16. The method of claim 14, further comprising:

when the requested amount of cloud resources exceeds the remaining amount for all users, denying, at the cloud service handler sub-layer, the service request.

17. One or more non-transitory computer-readable media storing instructions that, when executed by a computing platform cause the computing platform to:

when a service request from a client computing device is received at a cloud service handler sub-layer, extracting a plurality of service types, an identification of the client computing device, and a requested amount of cloud resources, wherein the plurality of service types includes a first service type and a second service type;

when the requested amount of cloud resources does not exceed a remaining amount of cloud resources remaining for the client computing device, forwarding, at the cloud service handler sub-layer, the service request with the extracted plurality of service types and the extracted requested amount of cloud resources to a cloud distribution sub-layer, wherein the remaining amount of cloud resources is remaining from a previously procured amount from one or more cloud service providers;

generating, at the cloud distribution sub-layer, a candidate list of cloud service providers supporting the extracted plurality of service types, wherein the candidate list includes a first cloud service provider and a second cloud service provider;

forwarding, at the cloud distribution sub-layer, the service request with extracted request amount and the candidate list to a cloud selection sub-layer;

initially selecting the first cloud service provider from the candidate list;

additionally selecting the second cloud service provider from the candidate list, wherein a selected at least one cloud service provider comprises the first cloud service provider and the second cloud service provider, wherein the first cloud service provider supports the first service type and not the second service type and the second cloud service provider supports the second service type and not the first service type, and wherein the first service type and the second service type are different; and forwarding, at the cloud selection sub-layer, the service request to the first and second service providers, wherein the first and second service providers provide requested cloud resources to the client computing device.

* * * * *